UNITED STATES PATENT OFFICE.

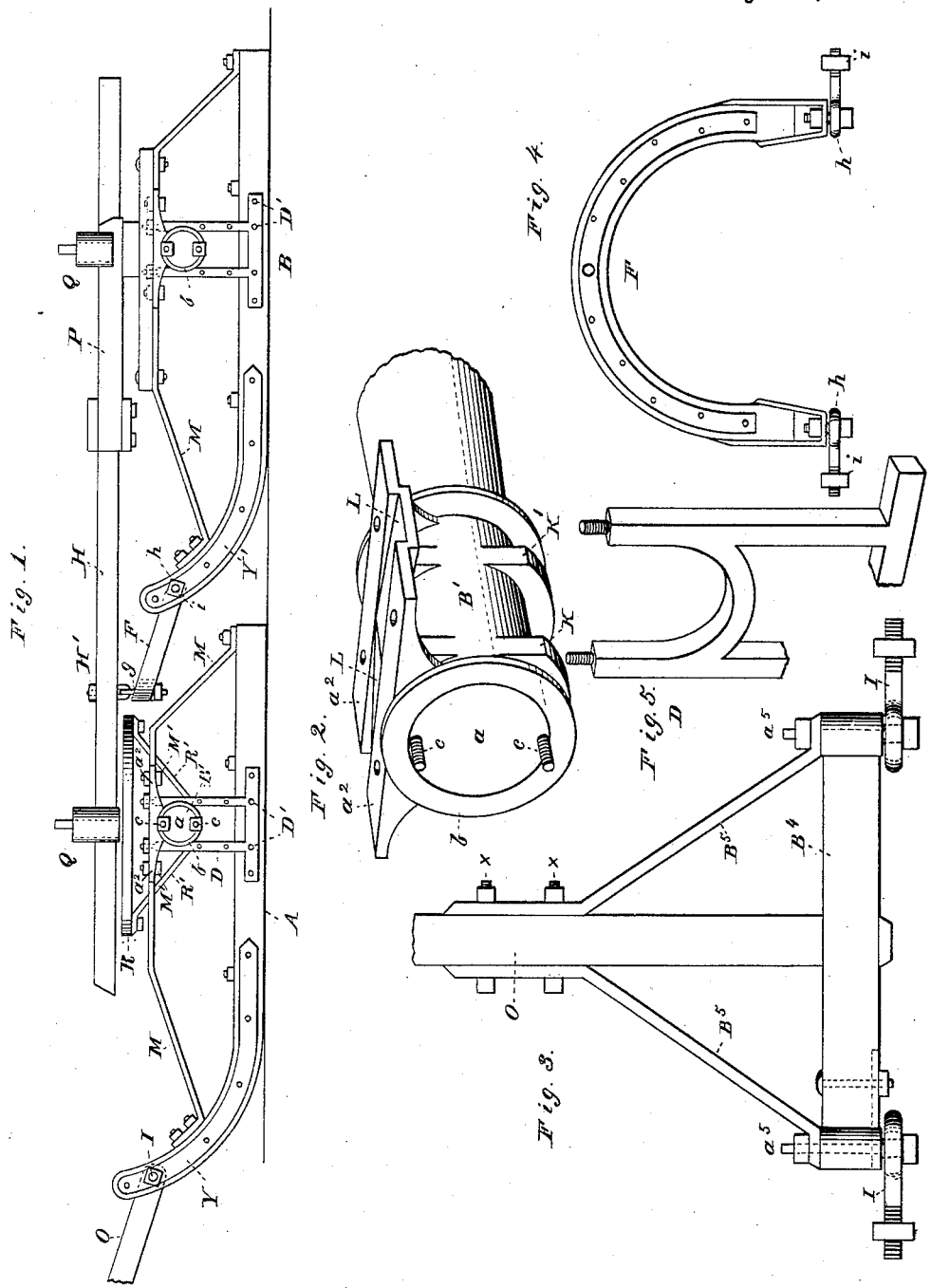

ANDREW NEWSTROM, OF RED WING, MINNESOTA.

BOB-SLED.

SPECIFICATION forming part of Letters Patent No. 341,679, dated May 11, 1886.

Application filed February 20, 1886. Serial No. 192,677. (No model.)

*To all whom it may concern:*

Be it known that I, ANDREW NEWSTROM, a citizen of the United States, resident at Red Wing, in the county of Goodhue and State of Minnesota, have invented certain new and useful Improvements in Bob-Sleds; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a side view. Figs. 2, 3, 4, and 5 are details showing different parts.

My invention has relation to bob-sleighs, and is designed as an improvement on Letters Patent No. 180,122, of July 25, 1876, granted to Erickson & Newstrom; and it consists in the construction and novel combination of parts, as will be hereinafter set forth, and pointed out in the claims.

Referring by letter to the accompanying drawings, A designates the front sleigh, and B the rear sleigh, which are provided with the bolsters Q Q, the latter being connected by the reach H and hounds P. The axle $a$ of the front sleigh is provided with a fifth-wheel, R, which is secured to said axle by upwardly-extending inclined braces R', bolted to the under side of said fifth-wheel R.

C C are the knee-posts, and D D are the U-irons, which are secured at their lower ends to the outer faces of the runner by bolts D', and are let at their upper ends into the flanges $a^2$ of the sleeves B', and secured in place by nuts. These sleeves B' are held in place on the journals of the axle $a$ by circular iron plates $b$, passed over threaded studs $c\ c$, projecting from the ends of the journals, said plates $b$ being held in place by nuts $b^2$, turned up on said studs $c\ c$. These sleeves B' are provided with two flanges, K K', at each end. The flanges $a^2\ a^2$ are separated by a double-inclined longitudinal groove, L L, and in these grooves the upper portions of the braces M M are secured by bolts M'.

The rear sled is connected to the reach H by a semicircular bail, F, which is properly ironed to give it strength, and is provided with eyebolts $h\ h$ at its rear end, by which it is connected to the forward ends of the runners of the rear sleigh or bob, nuts $i$ being employed to secure the bolts in place. At its middle the bail F is provided with swivel-bolt $g$, which is passed up through the reach H and secured in place by a nut, H'.

O designates the tongue, which is mortised into the cross-piece $B^4$ and strengthened by inclined braces $B^5$, secured to the tongue by bolts $x$ and to the cross-piece $B^4$ by bolts $a^5$. At its ends the cross-piece $B^4$ is provided on its rear face with eyebolts I I, which are secured in place by headed bolts J, passed through binding-irons J' and the ends of the cross-piece $B^4$. These plates and binding-irons prevent the bolts I I from breaking out of the wood of the cross-piece $B^4$. The bolts I I have their bearings in holes near the upper ends of the runner of the front sleigh, and these runners are strengthened by irons Y, bolted to their inner and outer faces.

By the employment of the U-irons D the runners are greatly strengthened, and are less liable to break with usage. By using the two flanges at each end of the box the outer flange protects the U-iron and furnishes a bearing for the plate $a$ or $b$.

The manner of attaching the tongue gives the sleighs full and easy play without danger of breaking the roller or hinge-bolts, and the semicircular bail F permits free motion of the rear sleigh without interference with the reach.

Having described this invention, what I claim, and desire to secure by Letters Patent, is—

1. The combination, with the axle-bearing, its journal provided with the threaded studs $c\ c$, of the sleeve B', provided with flanges K K' and the flanges $a^2\ a^2$, separated by the double-inclined longitudinal groove L, the runners provided with the U-irons and braces M, and the circular plate upon the end of the journal, substantially as specified.

2. The combination, with a front and rear sled, of a reach connecting the same, a bail pivotally secured at the opposite ends to the front ends of the rear sled-runners and swiveled at its forward portion to the reach, the eyebolts $h$ and bolts $i$, and the bolt $g$ and nut H', substantially as specified.

In testimony whereof I affix my signature in presence of two witnesses.

ANDREW NEWSTROM.

Witnesses:
J. C. McCLURE,
NILS LARSSON.